United States Patent
Ronkka et al.

Patent Number: 6,002,387
Date of Patent: *Dec. 14, 1999

[54] SYSTEM FOR TRANSFERRING INFORMATION BETWEEN A POINTER AND A DISPLAY INTERFACE

[75] Inventors: Risto Johannes Ronkka; Lasse Siitonen, both of Tampere, Finland

[73] Assignee: Nokia Mobile Phones, Ltd., Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/571,080

[22] Filed: Dec. 12, 1995

[30] Foreign Application Priority Data

Dec. 22, 1994 [FI] Finland ................... 946030

[51] Int. Cl.⁶ .................................................. G09G 5/00
[52] U.S. Cl. .......................................... 345/157; 345/179
[58] Field of Search ................... 345/157, 158, 345/173, 174, 179, 156; 178/18, 19, 19.07

[56] References Cited

U.S. PATENT DOCUMENTS

| | | | |
|---|---|---|---|
| Re. 34,187 | 3/1993 | Yamanami et al. | 178/19 |
| 4,686,332 | 8/1987 | Greanias et al. | 178/19 |
| 4,922,061 | 5/1990 | Meadows et al. | 178/18 |
| 4,929,934 | 5/1990 | Ueda et al. | 178/18 |
| 4,988,837 | 1/1991 | Murakami et al. | 178/18 |
| 5,016,002 | 5/1991 | Levanto | 345/50 |
| 5,045,645 | 9/1991 | Hoendervoogt et al. | 178/19 |
| 5,117,071 | 5/1992 | Greanias et al. | 178/19 |
| 5,138,118 | 8/1992 | Russell | 178/19 |
| 5,177,472 | 1/1993 | Taniishi et al. | 345/179 |
| 5,218,343 | 6/1993 | Stobbe et al. | 340/573.4 |
| 5,231,381 | 7/1993 | Duwaer | 345/174 |
| 5,349,139 | 9/1994 | Verrien et al. | 178/19 |
| 5,355,100 | 10/1994 | Riggio, Jr. | 345/179 |
| 5,369,227 | 11/1994 | Stone | 178/19.07 |
| 5,389,745 | 2/1995 | Sahamoto | 345/179 |
| 5,526,023 | 6/1996 | Sugimoto et al. | 345/179 |
| 5,557,076 | 9/1996 | Wieczorek et al. | 178/19 |
| 5,567,920 | 10/1996 | Watanabe et al. | 178/18 |
| 5,608,390 | 3/1997 | Gasparik | 178/18 |
| 5,679,930 | 10/1997 | Katsurahira | 345/179 |
| 5,706,000 | 1/1998 | Fukuzaki et al. | 341/5 |
| 5,730,602 | 3/1998 | Gierhart et al. | 345/179 |
| 5,799,107 | 8/1998 | Fukuchi | 345/156 |
| 5,883,338 | 3/1999 | Trunck et al. | 178/19.07 |

FOREIGN PATENT DOCUMENTS

| | | |
|---|---|---|
| 0 288 692 A3 | 11/1988 | European Pat. Off. . |
| 0 347 725 A3 | 12/1989 | European Pat. Off. . |
| 0 544 278 A3 | 6/1993 | European Pat. Off. . |
| 0 581 591 A1 | 2/1994 | European Pat. Off. . |
| 0 622 724 A2 | 11/1994 | European Pat. Off. . |
| 0622724 A2 | 11/1994 | European Pat. Off. . |
| 2 248 558 | 5/1975 | France . |
| WO 92/21082 | 11/1992 | WIPO . |
| WO 93/08559 | 4/1993 | WIPO . |

*Primary Examiner*—Jeffery Brier
*Assistant Examiner*—Paul A. Bell
*Attorney, Agent, or Firm*—Perman & Green, LLP

[57] ABSTRACT

In the information transfer method the information (I) is collected in the memory (55) of a pointing pen (51). A selected point on the display (43) is pressed with the tip of the pen (51), whereby a frequency change of the resonant circuit (42/52) indicates the contact, and a change in the resonance signal's strength in the receiving circuit determines the position of the pen. Then the oscillation of a second resonant circuit (43/53) is modulated with the information (I) in the memory. The received and demodulated (47) and possibly otherwise processed (48) signal is then presented on the display (43). With this method the user can transfer scanned information directly to the display of a pen computer or a mobile phone for further processing.

24 Claims, 6 Drawing Sheets

SYSTEM FOR TRANSFERRING INFORMATION BETWEEN A POINTER AND A DISPLAY INTERFACE

BACKGROUND OF THE INVENTION

1. Field of the Invention

The invention relates to a method using a pointing device for transferring information e.g. at a microcomputer having a display, or at the user interface of a mobile phone, and to a device combination realizing the method.

2. Description of the Prior Art

In the development of small size portable data processing and communications equipment we are repeatedly faced with the problem how to realize flexible, versatile and user friendly data entering. For instance present day notebook microcomputers and mobile phones have comparatively small displays, and the keyboard sizes are very limited. Thus it will be a slow and cumbersome process to enter data in these devices, so that in practice only simple and short messages can be transferred through the user interface.

Different solutions to the above problem have been found and also put into use. Such solutions are presented e.g. by the user interfaces based on a touch screen. Different types of touch screens were discussed in the Finnish computer paper PROSESSORI, n:o 1/94, p. 31 to 33 "Kosketusnäytöllä helpommin" ('Easier with a touch screen'). The article mentions analog methods based on capacitive, resistive, and force measurement techniques. Of the matrix methods the article mentions infrared, acoustic and possibly also resistive contact detection. This article, however, discusses touch screen applications primarily for larger monitors based on the cathode ray tube technology. FIG. 1 is a figure presented in said article, which shows how in principle a certain point P on the display can be selected with the finger H, and how changes in the capacitance are detected in the horizontal and vertical directions by the display's detection circuits S, which then produce a signal to be processed by the electronics of the display device.

For portable applications we know e.g. so called pen computers or PDA devices (Personal Digital Assistant) are on the market in the form of devices such as Apple Newton MessagePad, Sharp ExpertPad, or Casio XL-7000. These are microcomputers which easily fit in the hand and have no conventional keyboards, but data is entered by writing normal handwriting with a special pen on the touch screen of the device. Alternatively a keyboard picture corresponding to a standard keyboard may be activated on the device display, whereby the key positions are pressed with the tip of the pen. Then the display is realized by liquid crystal or LCD techniques, whereby the input section comprises a transparent digitizing layer over the display layer. The digitizing layer comprises for instance a plurality of digitizing points which are located in a matrix, and which as a result of a contact generate a physical response corresponding to the point of contact. The response is transformed into an electrical signal and in logic circuits it is interpreted into digital information. With the LCD technology the identification of contact points can be realized by different known methods, which for instance are based on the absorption of acoustic surface waves in the contact point, on infrared transmission and reception, on a change in the capacitance and a resulting change in frequency, on a change in pressure caused by the contact which is detected by a strain gauge or a piezoelectric transducer, on mechanical switch designs, and so on. One possibility is also to use the change of the magnetic field or the electromagnetic resonance to detect the point of contact.

FIGS. 2 and 3 illustrate a pen computer application presented in our patent application FI-941629 (the application's FIGS. 1 and 3b, respectively). FIG. 3 shows a mobile phone 31 and a display comprising layers 32, 33 on top of one another. The display also extends under the virtual keys 35. A permanent keyboard is located at 36. In this invention the pointing with the pen at a desired key location is aided by a sheet 34 provided with holes. In FIG. 2 it is shown in section, and its surface 11 has recesses 12, into which a pen is easily directed. A push with the pen 14 activates the transducer 13. In this case the transducers could be realized by keys in different technologies, such as mechanical miniature keys, membrane keys, or digitizing points on a digitizing pad or touch screen.

For instance an electromagnetic resonance method could be used when the above transducer is realized, see-figures 4 and 5. Then the pointing device, the pen 51, receives its operating power through the electromagnetic radiation created by the varying inductive field of the sensor table 41 and stores the energy in its own coupling circuit 52. The surface of the sensor table 41 is e.g. the glass sheet of an LCD display, and the electromagnetic radiation is created by resonant circuits under the display sheet 41, which are supplied by any suitable signal processing circuit 45. The resonant circuit 42 comprises a main capacitor and a coil. The pen 51 includes a resonant circuit 52 comprising a coil and a capacitor, whereby this circuit receives, stores and discharges a signal at the same frequency which it received from the sensor plate. When the display surface 41 is touched with the pen 51, the capacitance of the pen's electrical circuit will change, causing a mutual chance both in the received and in the transmitted signal. This causes a phase shift in the resonance frequency. The position of the pen 51 on the screen 41 is determined with the aid of the signal strength.

The above presented pen 51 can also include a lateral switch, which can be used to start a predetermined function in the receiving device 41. The state of the lateral switch can be detected e.g. by a change in the phase shift and/or in the frequency.

In order to automate data acquisition we know various equipment, of which we could mention scanners, for instance hand-held scanners, and bar code readers. A typical scanner assembly comprises the actual reader device, or a device which reads pictures and/or text and encodes them into an electrical signal, and further a cable and an interface card, through which the signal containing the scanned information is transformed into a form which can be processed e.g. by a computer. Alternatively the cable could be connected to a microcomputer's serial or parallel port through which the scanned information is read into the computer. In many cases the signal generated by the scanner is processed as such, in a bit map form. On the other hand the signal can be processed by a suitable program which detects the pixel position information generated by the scanner and combines these pixels in a suitable way to generate either simple lines or preferably e.g. characters. Character recognition programs have been developed into quite versatile programs, and now there are programs on the market which automatically can recognize different fonts and which can be "taught" to recognize different handwritings.

Bar code readers are quite widely used, for instance at shop check-outs where product information and prices are read and entered from the scanner through a cable/wire interface to the check-out computer. In the industrial production and storage field there are also different identification tasks where bar code readers are used. One typical application of a hand-held bar code reader is stocktaking, whereby a person performing the stocktaking with the aid of a reader identifies the contents of bar code stick-on labels fastened on the products and/or product packages. The collected information is stored in the memory of the bar code reader, and when the stocktaking is ended the data stored in the reader is discharged through a suitable cable interface to a microcomputer with a storage bookkeeping program, into which the collected data is entered. In addition to the mechanical connections the user must usually perform operations related to a microcomputer program, for instance enter instructions through a separate keyboard so that the collected data can be stored in the correct memory position determined by the program.

OBJECT OF THE INVENTION

The object of the invention is now to present a method with which the information to be communicated can be transferred in an easy way from a pointing device to a functional device and vice versa.

SUMMARY OF THE INVENTION

An essential feature of the invention is that the pointing device and the functional device include means with which the data collected in the pointing device is transferred to a selected position on the functional device's surface area, particularly on a display. Information can also be collected from a selected surface area to the pointing device. A first physical interaction is used to position the pointing device, a second physical interaction is used for any information transfer from the functional device to the pointing device, and a third physical interaction is used for information transfer from the pointing device to the functional device. These interactions can also be partly or wholly the same physical interaction on which the desired information is modulated.

Any positioning method known per se could be used to position the pointing device, such as one of the methods mention above in connection with the touch screens. Preferably a method based on electromagnetic resonance is used for the positioning as well as for the information transfer. Then the pointing device, for instance in the form of a pen, may contain a first resonant circuit for the positioning of the selected point and a second, or the same, resonant circuit through which information is transferred from the pen memory to a resonant circuit in the display. Preferably the resonant circuits can be used so that the energy required for the operation of the pen is received with the aid of the pen's resonant circuits from the display resonant circuit. The display can be an LCD-display, which in a way known per se from touch screens includes a resonant circuit formed by a transmit and receive antenna, and decoding and demodulating units which control the function and detect the received information.

The device receiving information from a pointing device with the transfer method according to the invention is preferably a pen computer or a mobile station, particularly a mobile phone.

BRIEF DESCRIPTION OF THE DRAWINGS

Below the invention is described in more detail with the aid of embodiment examples and with reference to the accompanying drawings in which.

DETAILED DESCRIPTION OF THE PREFERRED EMBODIMENT(S)

Figure 3:
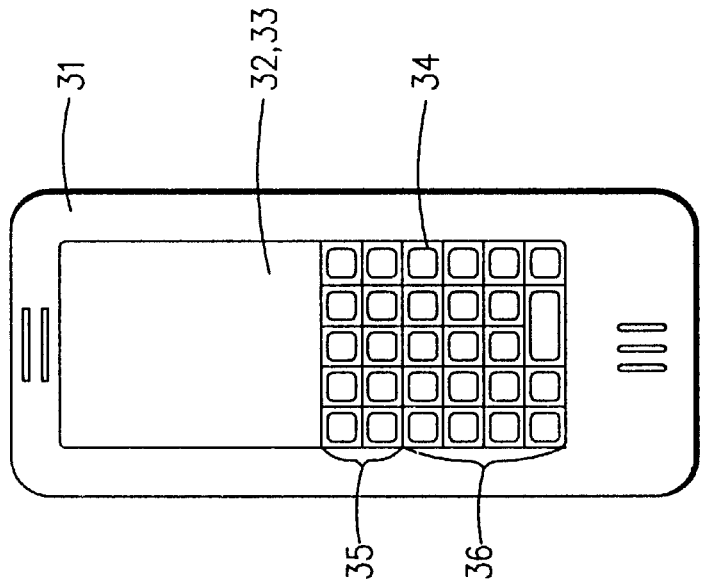
FIG. 3 illustrates a mobile phone 31, with a dual layer display 32,33 extending under the virtual keys 35, and having a keyboard 36 overlaid with a sheet 34 provided with holes, such as the surface 11 in FIG. 2, into which a pen is easily directed.
Figure 1:
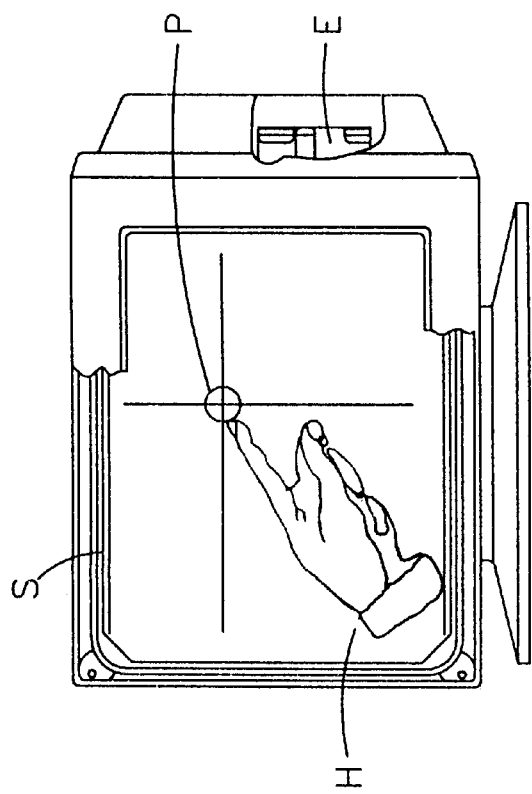
FIG. 1 illustrates a prior art arrangement wherein a finger on a hand H is used in selecting a point P on a display whereby changes in capacitance are produced and detected in the horizontal and vertical direction by the display's detection circuits S and a signal results that is processed by the display electronics.
Figure 2:
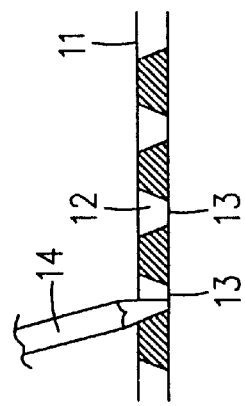
FIG. 2 illustrates a surface 11 in section in accordance with the prior art having recesses 12 into which a pen tip 14 may be directed for actuating a transducer 13 beneath the surface, which surface may be on the keyboard of a mobile phone such as shown in FIG. 3.
Figure 5:
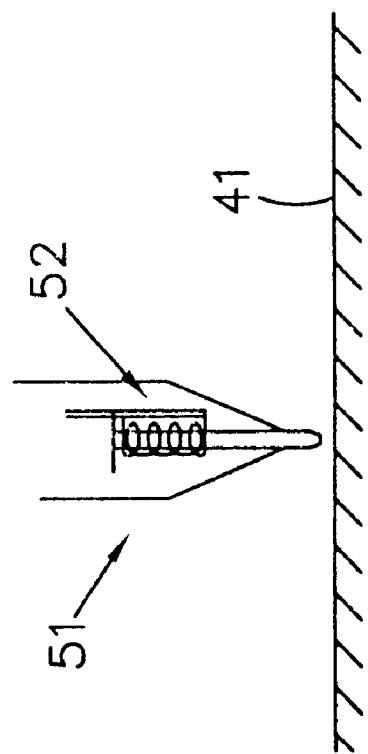
FIG. 5 illustrates the structure of a pen 51 that receives its operating power from the electromagnetic radiation created by the varying inductive field of the sensor table 41 of FIG. 4, by coupling through a resonant circuit 52 comprising a coil and capacitor that receive, store, and discharge a signal at the same frequency as received from the sensor table 41.
Figure 4:
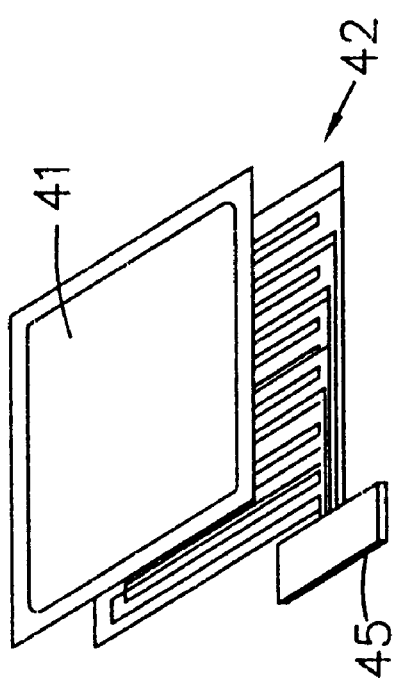
FIG. 4 illustrates the structure of an electromagnetic resonance transducer that can be used as transducer 13 in FIG. 2, having a sensor table 41 for receiving the tip of the pen, a resonance circuit 42, and a signal processing circuit 45.
Figure 6:
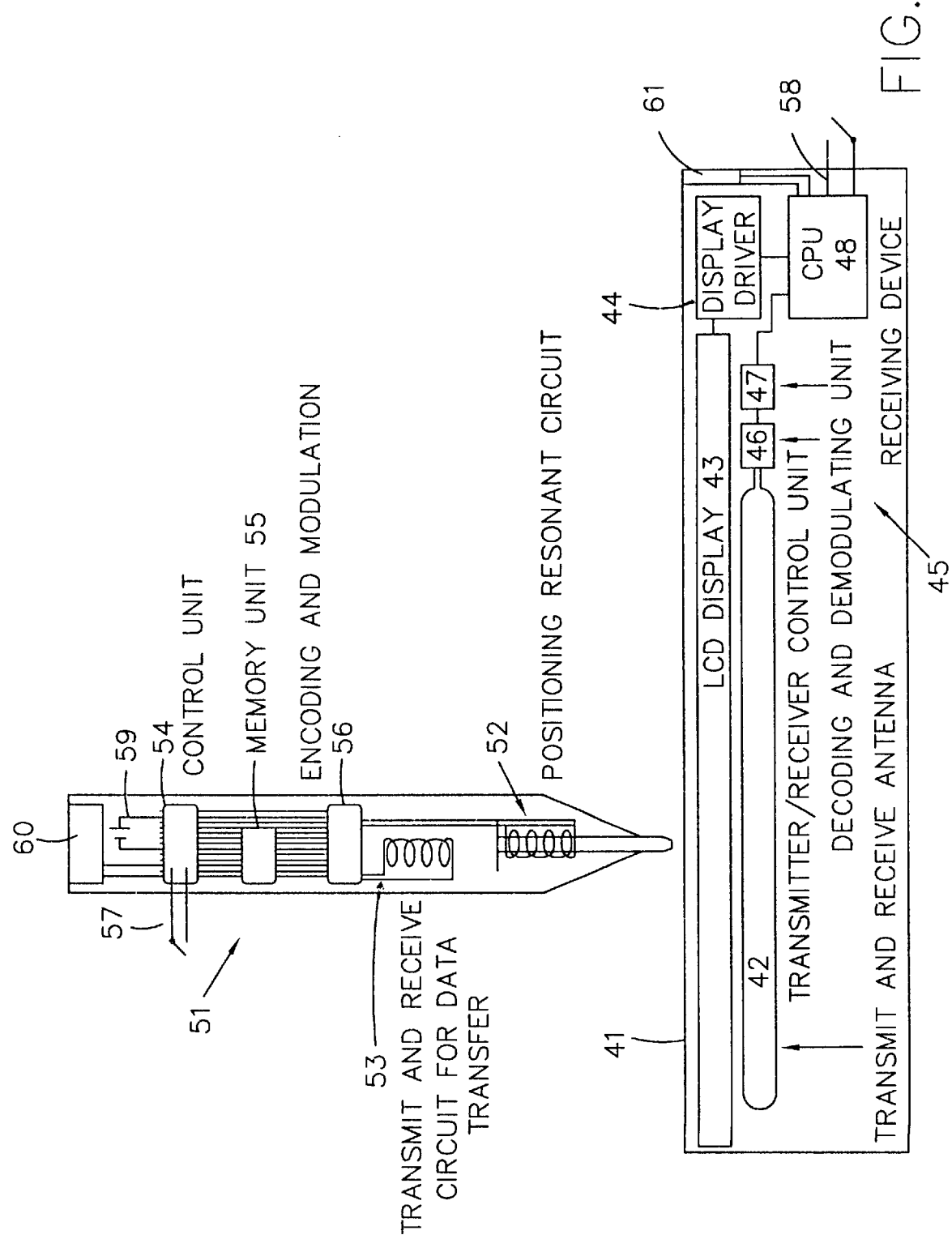
FIG. 6 shows the basic structure of a combination comprising a pointing device or a pen and a functional device or a pen computer which use the information transfer method according to the invention.

FIG. 6 shows a situation which employs the information transfer method according to the invention. The figure shows a combination comprising a pen 51 and an LCD display 41 for information acquisition, storage and display. The collected information is first transferred to the pen where it is temporarily stored, and then it is transferred to the pen computer, in which the collected data is presented on the display.

The pointing device or the pen 51 receives through an interface, not shown, information acquired e.g. by a scanner. The collected information is stored in a memory unit 55. The functions of the pen are controlled by a control unit 54, which controls the memory and also the encoding and modulating unit 56. A positioning resonant circuit 52 interacts in a way known per se with a transmit and receive antenna 42 under the display's surface 41 and the LCD display unit 43. The resonant circuit 52 comprises a main capacitor and a coil, and it receives from the display the energy required for its operation.

Thus the coil and the capacitor function as a resonant circuit 52, which receives, stores and discharges a signal at the same frequency which the resonant circuit below the display transmitted. When a person now uses the pen 51 and touches the surface of the display 41 the capacitance of the transducer in the pen's electrical circuit will change, and this causes a change both in the received and in the transmitted signal. This is also evident as a phase shift of the resonance frequency, which is detected by the transmit and receive antenna 42. The position of the pen on the screen is positioned with the aid of the detected signal strength. When the pen is provided with a lateral switch 57 in order to trigger the information transfers described below, the state of the switch can also be detected based on the phase shift and frequency change in the signal returning to the display. Alternatively the information transfer could be activated automatically, when it is detected that the pen touches the display surface.

The pen also has a second resonant circuit 53 for information transfer. The resonant circuit 53 also receives the electromagnetic oscillation from the display, and when suitably dimensioned, a resonant oscillation is created in the circuit in synchronization with the received oscillation. The lateral switch 57 triggers the information transfer from the pen. Controlled by the control unit the encoding an modulating unit 56 reads information stored in the memory 55. The information is encoded and this encoded information is used to modulate the frequency of the resonant circuit 53. The modulated signal radiates from the pen 51 to the display 41. Information can be transferred from the display to the pointing device in a corresponding way. For positioning and information transfer the pointing device can use separate resonant circuits or perform several functions with the same resonant circuit.

Any method known per se can be used for the modulation, e.g. frequency modulation (FM), pulse code modulation (PCM), or quadrature phase shift keying (QPSK).

The transmit and receive antenna 42 receives the modulated oscillation and this is supplied to the signal processing unit 45. There is first a transmitter/receiver unit 46 e.g. for amplification of the signal, and then the signal is demodulated and decoded in the unit 47. The decoded signal is supplied to the logic, which suitably is a microprocessor 48. The signal is processed by programs in the microprocessor, and on the basis of the results from the processing the microprocessor 48 controls the display driver 44 to present an acknowledgement signal in a position defined by the program.

Signal processing in the microprocessor 48 is preferably invisible to the user, so that information transferred from the pen is displayed as such in the position selected with the pen. Then the user perceives the operation as if the information stored in the pen would be "dropped" at the selected position on the display. Information transferred from the display to the pointing device can be affected through the microprocessor 48 under the control of a switch 58.

The method according to the invention can also be realized as a method based on magnetism. Then the pointing device contains no receive circuit, but the energy required to generate and modulate the transmit signal is supplied by a battery or other suitable energy source 59 connected to the pointing device.

Light waves, particularly infra-red waves can also be used in the information transfer. Then the pointing device and the functional device both include optical transmitter and receiver components 60 and 61, respectively. In the functional device the optical device 61 can be located in edge of the display panel, whereby the pointing device can be used in separate actions, first to select a surface area on the screen, and then the pointing device can be moved to the optical component where the information is transferred.

Figure 7:
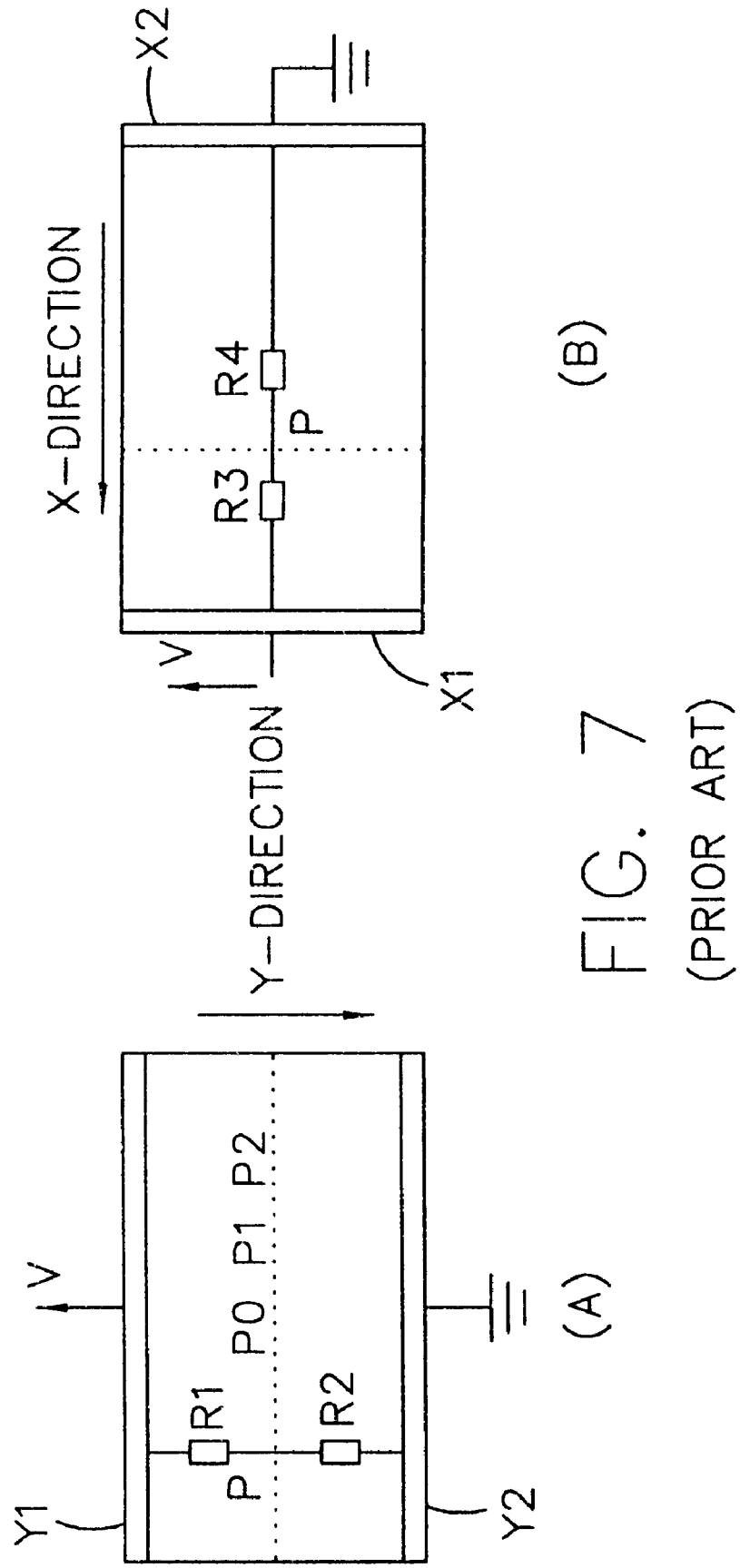
FIG. 7 illustrates the function known per se of a display embodying an information transfer method based on resistivity change.

The display can also be a display reacting to contact force, e.g. a touch screen based on resistivity. FIG. 7 illustrates the basic operation of a display of this kind containing layers under the screen, in which the resistivity changes due to a weight applied to the screen surface. The figure (a) on the left shows how the contact is detected in the vertical direction (Y direction). The edge y1 of the first resistive layer at the screens' top edge is connected to the supply voltage V, and correspondingly the bottom edge y2 is connected to ground. When a point P on the screen is touched by a pointing device or a pen the resistances R1 and R2 between this point and the edges y1 and y2, respectively, will change. This change is detected in a way known per se. In a corresponding way the figure (b) on the right shows detection of a horizontal (X direction) contact. The voltage V is connected to the left edge. The change in the resistances R3 and R4 between the point of contact P and the edges is detected.

When a resistivity based touch screen is used, then the pointing device such as a pen does not need the positioning system or the circuit 52 shown above in FIG. 6. but the point of contact is detected solely as resistance changes in the screen. Instead of the circuit 53 in FIG. 6 we must use a circuit which generates mechanical oscillations (not shown). The mechanical oscillations are detected as modulated resistance variations in the screen. A person skilled in the art understands that the function can be similar to that described above in connection with the resonance method. In this case the simplest way to trigger the transfer is to use a lateral switch in the pen. The pen must have an energy source of its own to transmit the modulated oscillation signals to the display, because no energy can be transferred from the display to the pen in the method based on resistivity. Neither is it possible to transfer information from the display to the pen in the method based on resistance changes.

Figure 8:
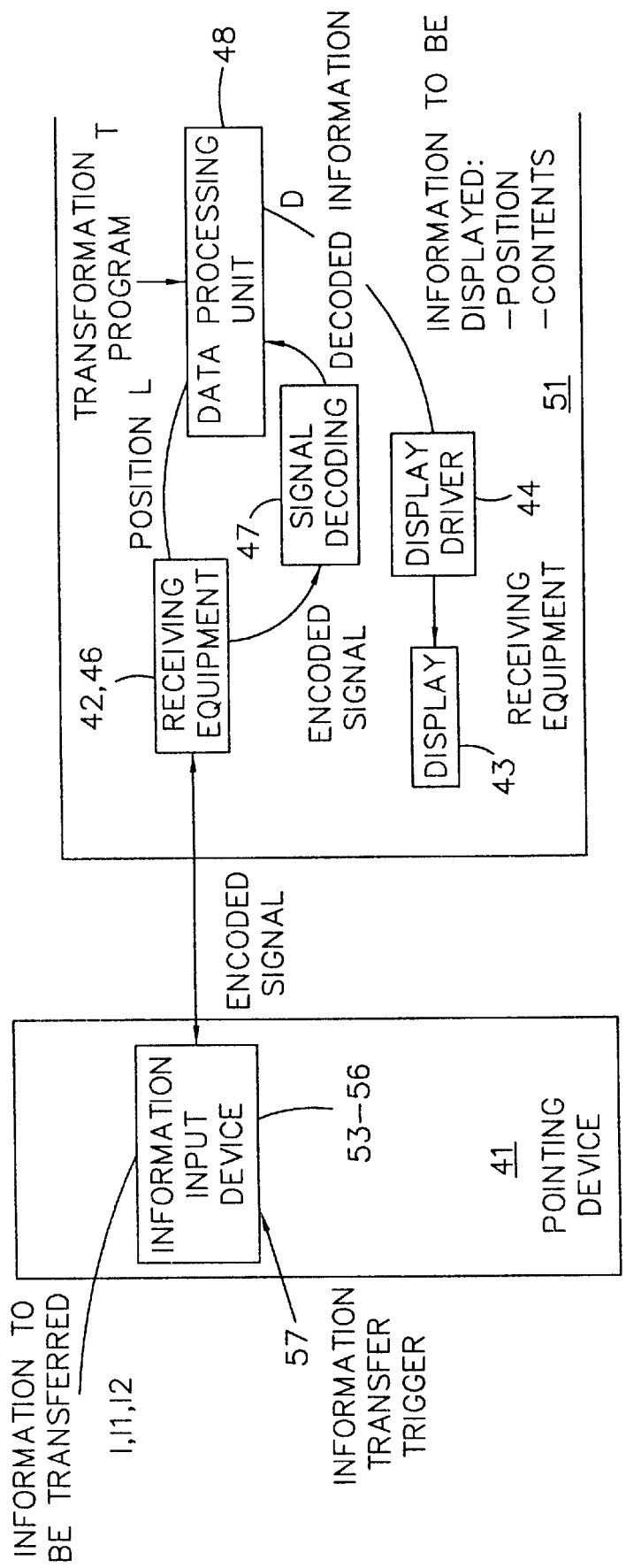
FIG. 8 shows a simplified block diagram of an operation mode of the transfer method according to the invention.

Another way to realize the method according to the invention is considered with the aid of FIG. 8. Here we assume that information is transferred through electromagnetic resonance from the pointing device to the receiving device.

The information to be transferred or the desired information I is collected with a hand-held scanner or another corresponding device to the pen pointer 51'. The scanner can be a bar code scanner, a character scanner or a picture scanner, or any other data acquisition device. The scanner can of course also be integrated in the pointing device 51, so that we obtain a combined scanner-pen. Then of course the scanner must have a power supply of its own.

The pen 51 is used to point at that position on the screen 41 where the collected information is to be transferred. The information transfer is started e.g. by pressing a button or lateral switch 57 on the pen. There can also be an automatic triggering when the pen touches the screen, or when the pen is sufficiently close to it, as was mentioned above.

The oscillating circuit in the pen begins to oscillate at a frequency determined by the oscillating circuit. The pen receives energy from the electromagnetic radiation transmitted by the receiving device, such as the transmit antenna 42 in FIG. 6.

In order to transfer the information it is modulated in the information input devices 53–56 using known modulation methods. The position information is either modulated on the same frequency or alternatively a separate resonant frequency is used to transfer the position information. The contact surface of the screen, the antenna or the sensor 42, 46 receives the modulated signal and directs the signal to a decoding unit 48. The position information L of the pointing device is also transmitted to the data processing unit.

Figure 9:
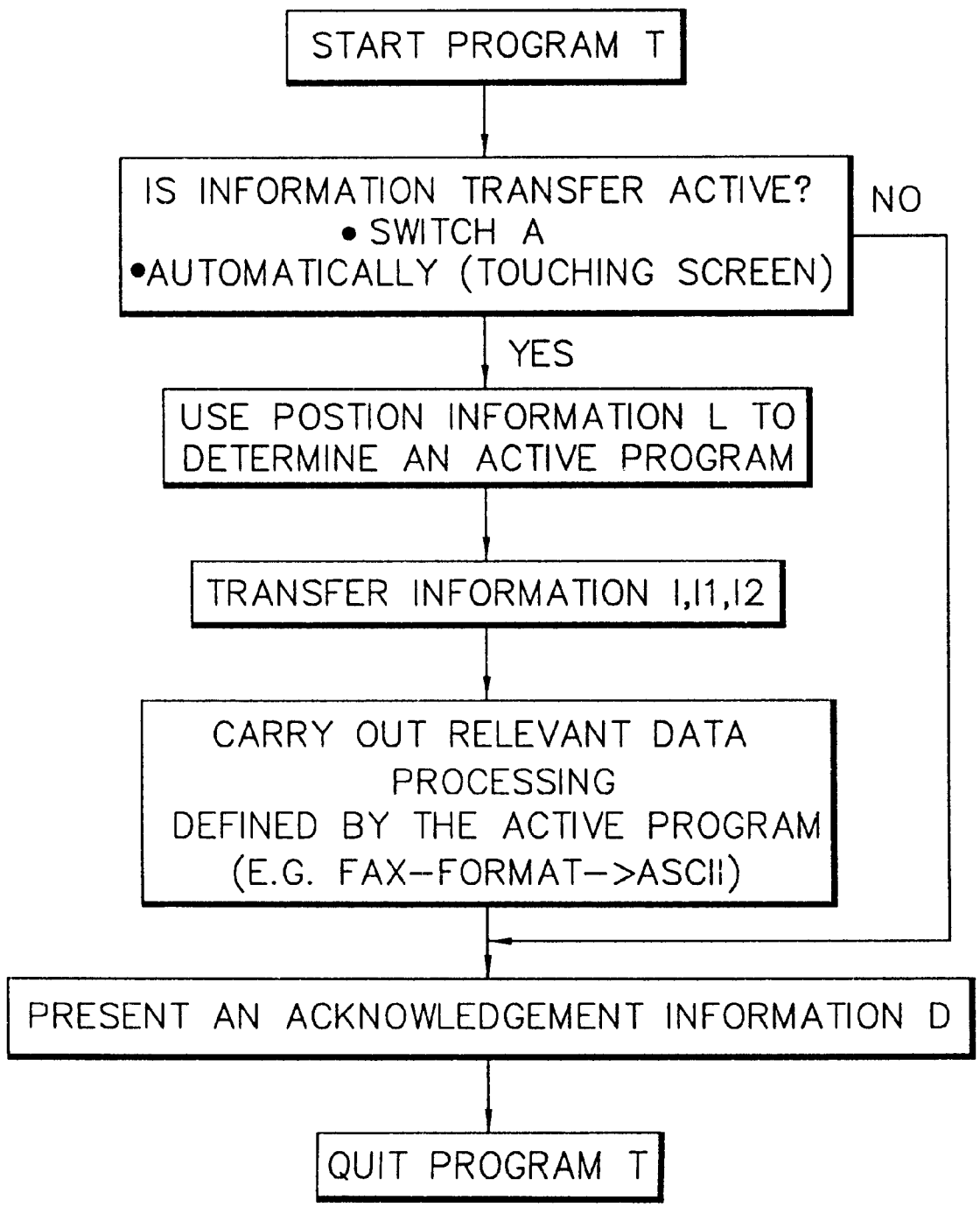
FIG. 9 is a flowchart illustrating the steps executed by a transformation and processing program T in the data processing unit to convert a signal from a telefax format to an ASCII code.

As shown in FIG. 9, the collected data is processed in the data processing unit 48 by a transformation and processing program T, know per se. As shown in FIG. 9, the transformation can be for instance a conversion algorithm used in telefax programs, which converts the signal from the telefax format into an ASCII code. Then the processed information D is transferred with the position information to the display driver 44, which outputs the information in the position on the display 43 which was pointed out by the pen.

In the case of FIG. 8 the end result is that the information acquired by the user is transferred to the selected place on the display. Then the user can process the information in a desired way according to the possibilities of the processing programs T. In this way the user can easily transfer the collected data directly to a place pointed out on the display. The transfer method is wireless, and the different intermediate steps, such as the data processing, are invisible to the user.

The information on the screen can also be collected to the pointing device in a corresponding way as was described above for the information transfer from the pointing device to the screen. Then it is possible to collect information with the pointing device from the screen and move it to another place. It is also possible to move the information from the screen of one device, e.g. from a pen computer, to the screen of a second device, e.g. a mobile phone, to be further processed.

Here we presented only a few currently preferred ways to realize the method according to the invention. As we mentioned in the introduction, the touch screens can be realized by many different methods and in many different ways, and it is also possible to implement these method in the invention. Examples are e.g. ultrasonic, infra-red, acoustic, light, etc. The pointing device or the pen is of course realized so that it is compatible with the method used in the functional device.

While we here considered primarily pen computer applications, the method according to the invention is well suited to be used in a mobile phone. Then it is also conceivable that the user reads a telephone number from his notebook with a small pen scanner and then "places" it on the screen, so that the telephone can then call the number dialed in this way. It is further conceivable that the mobile phone is provided with a suitable data communications program, so that information, for instance a picture or text, collected with a hand-held scanner and entered on the telephone's screen is then transferred from the mobile phone over the radio link to any receiving device.

Of course there is nothing that prevents the presented method to be used in larger monitors and digitizing tables.

What is claimed is:

1. A method for processing information (I) to be communicated in a system that consists of a pointing device (51) and a functional device (41) that has at least two applications for processing information and display means with an active surface area (43) for visually displaying information, wherein a) the pointing device (51) is positionable in substantial contact with a selected contact position on the active surface area (43); and b) the selected contact position is detected through a first physical interaction (52,42) between the pointing device (51) and the active surface area (43) and indicative position information is produced; and c) information is transferred between the pointing device (51) and the functional device (41) characterized in that d) information (I) to be communicated that is transferred between the pointing device (51) and the functional device (41) is at least partly displayed for viewing on said display means; and e) said at least two applications for processing information are coupled to respective contact positions on said display means, and the processing of said information (I) to be communicated is carried out according to said detected selected contact position by using said indicative position information to couple said information (I) to be communicated to the respective one of said at least two applications for processing information that is coupled to said detected selected contact position.

2. A method according to claim 1, characterized in that said information (I) to be communicated is transferred by modulating the information to a second physical interaction between the functional device and the pointing device.

3. A method according to claim 2, characterized in that at least one of said first and second physical interactions is an electromagnetic resonance interaction between a resonant circuit (42) of said active surface area and a resonant circuit (52,53) of the pointing device.

4. A method according to claim 2, characterized in that operating energy for the pointing device is transferred from the functional device to the pointing device through a third physical interaction between the active surface area and the pointing device.

5. A method according to claim 4, characterized in that at least two of the first, second and third physical interactions are the same physical interaction.

6. A method according to claim 4, characterized in that the operating energy for the pointing device is received by a resonant circuit (52,53) in the pointing device.

7. A method according to claim 2, characterized in that the second physical interaction is a modulated change of said active surface area's resistivity (R1–R4) caused by the pointing device acting with a mechanical contact which is modulated by said information to be communicated.

8. A method according to claim 7, characterized in that the energy for the mechanical contact modulation is supplied from an energy source arranged in the pointing device.

9. A method according to claim 2, characterized in that the second physical interaction is a visible electromagnetic wave, which is transmitted between an optical transmitter and an optical receiver that are individually connected to the display means of the functional device and to the pointing device.

10. A method according to claim 1, characterized in that the transfer of said information (I) to be communicated is through said selected contact position on the active surface area.

11. A method according to claim 1, characterized in that the first physical interaction is a change of said active surface area's resistivity (R1–R4) caused by the mechanical contact of the pointing device.

12. A method according to claim 1, characterized by the steps in which:

the pointing device (51) is positioned at a first selected position on the active surface area;

the first selected position is determined through the interaction between the pointing device and the active surface area;

the information (I) to be communicated is connected to the first selected position on the surface area and is transferred to a memory (55) of the pointing device;

the pointing device is positioned at a second selected position on the active surface area;

the second selected position is determined through the interaction between the pointing device and the active surface area; and the information (I) stored in the memory of the pointing device is transferred to the functional device.

13. A method according to claim 1, characterized in that said functional device is one of a pen computer and a mobile phone.

14. A method to transfer information between a pointing device and a functional device having at least two applications for processing information and a visual display with an active screen surface with receiving surface areas respectively coupled to said at least two applications for processing information, characterized by the steps in which:

1) information (I) to be transferred is collected into a memory of the pointing device;

2) a selected point on the active screen surface of the display acting as a receiving surface area for one of said at least two applications for processing information, is pressed with the pointing device to produce a first interaction between the pointing device and the screen surface indicating the pressed point, which pressed point indication result is stored in a first memory position of the functional device;

3) control logic of the pointing device reads the information (I) in its memory, and encodes/modulates with this information a signal producing a second physical interaction between the pointing device and the display, whereby the signal is transferred to the selected point of the display;

4) receiving means of the display receive and decode/demodulate the transferred signal to reproduce the information (I) transferred therewith, and then the reproduced transferred information is stored in a second memory position of the functional device;

5) logic of the functional device joins logically the information in the first and second memory positions with the aid of a program stored in its memory, processes the joined information in accordance with the one of said at least two applications for processing information that the selected point acts as a receiving area with the aid of said program, and controls the display driver to visually display acknowledgement information according to the program in a position on the display determined by the program; and then 6) the pointing device is raised from the display and the information transfer is ended.

15. A method according to claim 14, characterized in that the acknowledgement information is at least partly the transferred information.

16. A method according to claim 14, characterized in that the point on the visual display determined by the program is the selected point pressed by the pointing device.

17. A method according to claim 14, characterized in that the transfer of information is started by the trigger function of a switch mounted in one of the pointing device and the functional device.

18. A method according to claim 14, characterized in that the transfer of information is started when one of the following steps has occurred:

the pointing device has touched the surface area, and the functional device has determined the position on the surface area where the pointing device is located.

19. A combination of a pointing device, having a contact point, and a display, having an interactive screen contact surface, for transferring energy and information therebetween, characterized in that the pointing device comprises:
a control unit;
a memory unit, coupled to said control unit and storing information;
an encoding and modulating unit, coupled to said control unit and said memory unit; and
means coupled to and controlled by the encoding and modulating unit, comprising:
a first resonant circuit for positioning the contact point; and
a second resonant circuit for transmitting information, received from said memory unit under the control of said control unit and encoded/modulated by said encoding and modulating unit, to said contact point and for receiving energy and modulated information from said contact point; and the display comprises:
at least two antennas, disposed in said interactive screen contact surface, for the transmission and reception of energy and information in exchanges with said second resonant circuit through said contact point;
a control means for controlling the transmission and reception of energy and information by said antennas;
a decoding and demodulating unit, for decoding and demodulating information received by said antennas that has been encoded/modulated by said encoding and modulating unit;
a data processing unit, having a memory and coupled to said decoding and demodulating unit, for receiving and processing information from said decoding and demodulating unit, and having at least two information processing applications respectively coupled to said at least two antennas;
a visual display surface disposed in said interactive screen contact surface; and
a driver for the visual display surface, coupled to said data processing unit for producing a visual display of at least part of the information being processed on said visual display surface in accordance with the one of said at least two information processing applications coupled to the one of said at least two antennas at said contact point.

20. A combination of a pointing device and a display, characterized in that the pointing device comprises:
a control unit,
a memory unit coupled to said control unit for storing information under the control of said control unit, an encoding and modulating unit coupled to said control unit and said memory unit,
a mechanical contact on an end of said pointing device; and
an oscillating circuit controlled by the encoding and modulating unit for transmitting information from said memory unit, encoded/modulated by said encoding and modulating unit, to said mechanical contact, and that the display comprises:
a contact surface for receiving information from said mechanical contact when engaged thereby and having different engagement positions on said surface respectively coupled to different applications for processing information, a layer in said contact surface which detects a change of resistivity in response to the engaging by said mechanical contact, a reception control unit for controlling the information received by said contact surface and responsive to the engagement position on said surface engaged by said mechanical contact for producing a position signal indicative thereof, a decoding and demodulating unit coupled to said reception control unit for receiving said position signal and decoding/demodulating the information received by said reception control unit in accordance with the respective one of said different applications for processing information coupled to the engagement position on said surface that is engaged, a visual display surface disposed in said contact surface, and a data processing unit coupled to said decoding and demodulating unit, for receiving and processing said position signal and information from said decoding and demodulating unit, and a display driver for the visual display surface, coupled to said data processing unit for producing a visual display in accordance with the processing of said position signal by said data processing unit.

21. A combination of a pointing device and a functional device in which, the functional device comprises:

display means with an active surface area to display information and having different contact positions on said surface area respectively coupled to different applications for processing information;

means for detecting the contact position of the pointing device on the active surface area of the display means through a first physical interaction; and the pointing device comprises:

means for transferring information between said pointing device and said functional device;

characterized in that the functional device comprises:

means for driving said display means to display at least partly the information transferred between the pointing device and the functional device; and means for processing said information according to the one of said different applications for processing information coupled to said detected contact position.

22. A combination according to claim 21 characterized in that said pointing device comprises resonant circuit means for receiving operating energy from said functional device.

23. A combination of a pointing device and a functional device in which, the functional device comprises:

display means with an active surface area to display information;

means for detecting the contact position of the pointing device on the active surface area of the display means through a first physical interaction; and the pointing device comprises:

means for transferring information between said pointing device and said functional device;

characterized in that the functional device comprises:

means for driving said display means to display at least partly the information transferred between the pointing device and the functional device; and means for processing said information according to said detected contact position.

24. A combination according to claim 23 characterized in that said pointing device comprises resonant circuit means for receiving operating energy from said functional device.

* * * * *